(12) United States Patent
Appleyard

(10) Patent No.: US 11,919,210 B2
(45) Date of Patent: Mar. 5, 2024

(54) APPARATUSES AND METHODS FOR DISPENSING POTTING MATERIAL

(71) Applicant: The Boeing Company, Chicago, IL (US)

(72) Inventor: Jeffrey R. Appleyard, Stonewall (CA)

(73) Assignee: The Boeing Company, Chicago, IL (US)

( * ) Notice: Subject to any disclaimer, the term of this patent is extended or adjusted under 35 U.S.C. 154(b) by 300 days.

(21) Appl. No.: 17/133,062

(22) Filed: Dec. 23, 2020

(65) Prior Publication Data

US 2021/0138699 A1     May 13, 2021

Related U.S. Application Data

(62) Division of application No. 15/699,738, filed on Sep. 8, 2017, now Pat. No. 10,981,305.

(51) Int. Cl.
| | |
|---|---|
| *B29C 43/58* | (2006.01) |
| *B29C 31/04* | (2006.01) |
| *B29C 70/68* | (2006.01) |
| *B29C 70/74* | (2006.01) |
| *B29L 31/60* | (2006.01) |

(52) U.S. Cl.
CPC .............. *B29C 43/58* (2013.01); *B29C 31/04* (2013.01); *B29C 70/682* (2013.01); *B29C 70/745* (2013.01); *B29C 31/042* (2013.01); *B29L 2031/608* (2013.01)

(58) Field of Classification Search
CPC .............................. B29C 43/58; B29C 70/745
See application file for complete search history.

(56) References Cited

U.S. PATENT DOCUMENTS

| | | | |
|---|---|---|---|
| 5,447,425 A | 9/1995 | Hsu et al. | |
| 6,884,055 B2 * | 4/2005 | Cox | ..................... B29C 31/044 425/127 |

\* cited by examiner

*Primary Examiner* — Seyed Masoud Malekzadeh
*Assistant Examiner* — Timothy G Hemingway
(74) *Attorney, Agent, or Firm* — Quinn IP Law

(57) ABSTRACT

A method of injecting potting material into at least a portion of a workpiece, comprises positioning a potting press, containing the potting material, over a target area of the workpiece. The target area contains openings, passing entirely through the workpiece. Simultaneously with positioning the potting press over the target area of the workpiece, the potting material is injected into each one of the openings within the target area.

20 Claims, 9 Drawing Sheets

APPARATUSES AND METHODS FOR DISPENSING POTTING MATERIAL

CROSS-REFERENCE TO RELATED APPLICATIONS

This application is a divisional of U.S. aatent application Ser. No. 15/699,738, entitled "Apparatuses for Dispensing Potting Material", filed on Sep. 8, 2017, now U.S. Pat. No. 10,981,305 issued on Apr. 20, 2021. the disclosure of which is hereby incorporated by reference in its entirety.

TECHNICAL FIELD

The present disclosure relates to apparatuses and methods for dispensing potting material.

BACKGROUND

Potting material is introduced into substrates, such as honeycomb cores, to provide an attachment zone for hardware to be used in a finished structure, e.g., a door. Current methods of introducing potting material into such substrates involve time-consuming manual operations, and may cause excessive release of fumes from exposed potting material.

SUMMARY

Accordingly, methods, intended to address at least the above-identified concerns, would find utility.

The following is a non-exhaustive list of examples, which may or may not be claimed, of the subject matter according to the invention.

One example of the subject matter according to the invention relates to a potting-press assembly for injecting potting material into at least a portion of a workpiece. The potting-press assembly comprises a chassis and a potting press, pivotally coupled to the chassis. The potting-press assembly also comprises a control unit, fixed to the chassis and configured to cause the potting press to be selectively pressurized.

Use of a support structure (e.g., chassis) with the potting press pivotally coupled thereto, as set forth above, permits the potting press to be positioned at a desired orientation relative to the workpiece. When the workpiece is a flat substrate, for example, it may be advantageous to position the potting press at a normal angle relative to the substrate. Accurate orientation of the potting press allows the potting press to be positioned flush with a surface of the workpiece, thereby reducing exposure of the potting material to the ambient environment and minimizing waste of excess potting material between the potting press and the workpiece. Use of a control unit to pressurize the potting press, as set forth above, allows for automated (i.e., non-manual) injection of potting material from the potting press. Selective pressurization of the potting press allows for more controlled injection of the potting material into the workpiece, thereby reducing waste of excess potting material.

Another example of the subject matter according to the invention relates to a system for injecting a potting material into at least a portion of a workpiece. The system comprises a base, which in turn comprises a support surface. The system also comprises a hold-down, configured to secure the workpiece relative to the support surface, and a reaction clamp, configured to be coupled to the base. The system additionally comprises a potting-press assembly, comprising a chassis, a potting press, pivotally coupled to the chassis, and a control unit, fixed to the chassis and configured to selectively pressurize the potting press.

Use of a base, as set forth above, allows for support of the workpiece in proximity to a potting-press assembly. Use of a hold-down, as set forth above, allows for the secure retention of the workpiece in a stationary location relative to a potting-press assembly. Use of a reaction clamp coupled to the base and pivotally coupled to the chassis, as set forth above, allows for more stable positioning of the potting-press assembly relative to base. Use of a support structure (e.g., chassis) with the potting press pivotally coupled thereto, as set forth above, permits the potting press to be positioned at a desired orientation relative to the workpiece. When the workpiece is a flat substrate, for example, it may be advantageous to position the potting press at a normal angle relative to the substrate. Accurate orientation of the potting press allows the potting press to be positioned flush with a surface of the workpiece, thereby reducing exposure of the potting material to the ambient environment and minimizing waste of excess potting material between the potting press and the workpiece. Use of a control unit to pressurize the potting press, as set forth above, allows for automated (i.e., non-manual) injection of potting material from the potting press. Selective pressurization of the potting press allows for more controlled injection of the potting material into the workpiece, thereby reducing waste of excess potting material.

Yet another example of the subject matter according to the invention relates to a method of injecting a potting material into a workpiece. The method comprises positioning a potting press, which contains the potting material, over a target area of the workpiece. The target area contains openings that pass entirely through the workpiece. The method also comprises simultaneously injecting the potting material into each one of the openings within the target area.

The potting material may be reliably injected into the workpiece using an automated process. The potting press carries the potting material and is positionable over a target area of the workpiece. The target area may include multiple openings that pass entirely through the workpiece, such as the cells of a honeycomb core. The method enables injection of the potting material simultaneously into each of the openings within the target area.

BRIEF DESCRIPTION OF THE DRAWINGS

Figure 1:
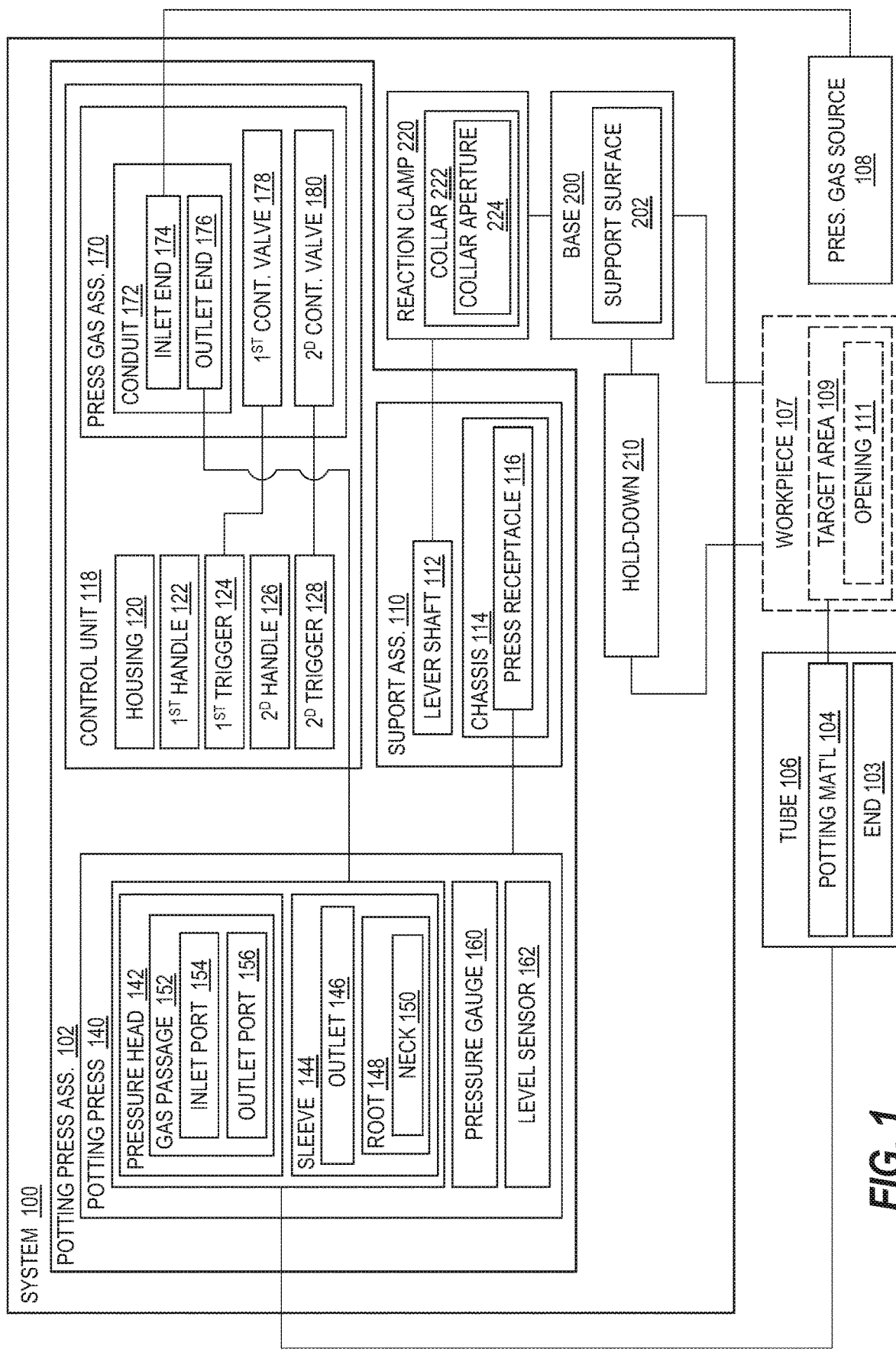
Figure 2:
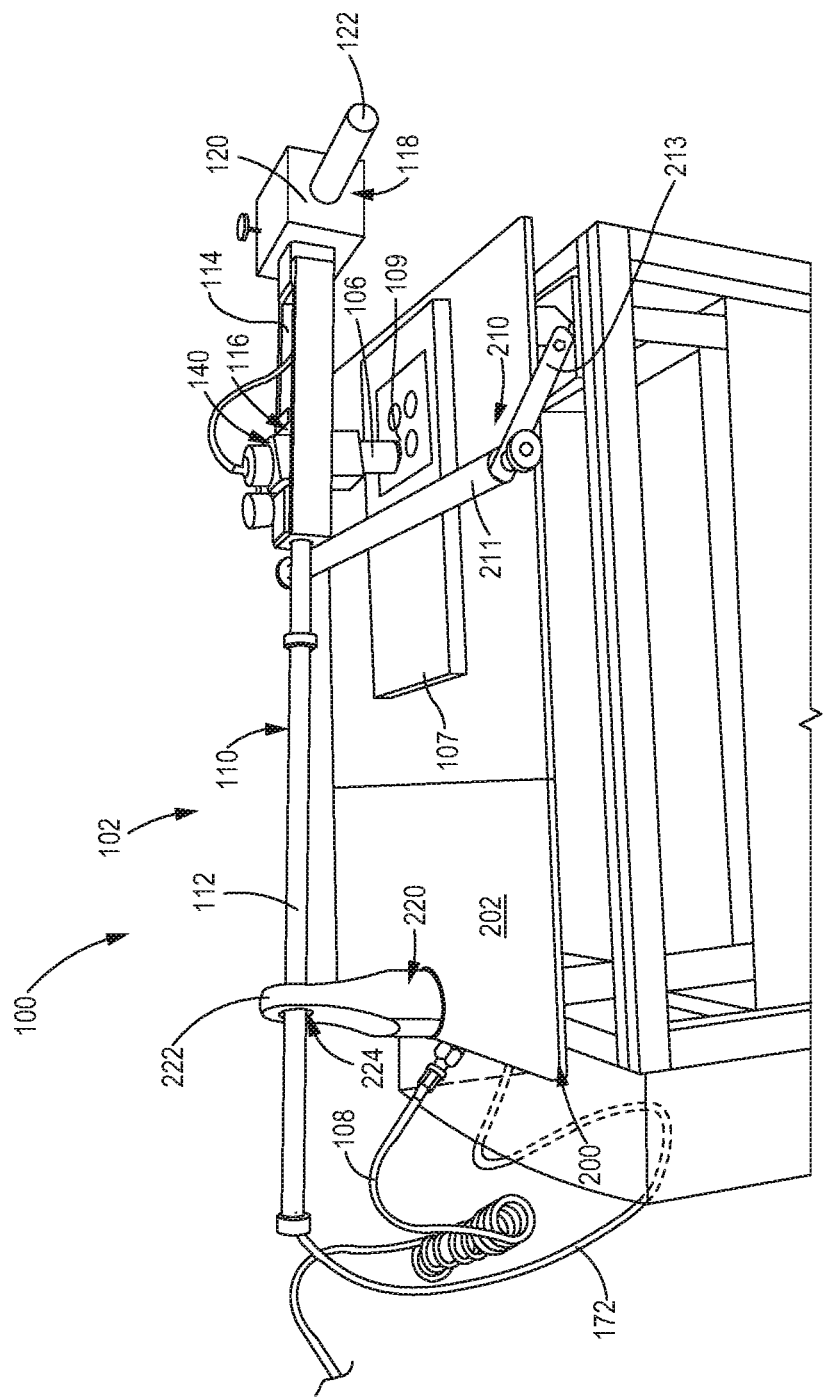
Figure 3:
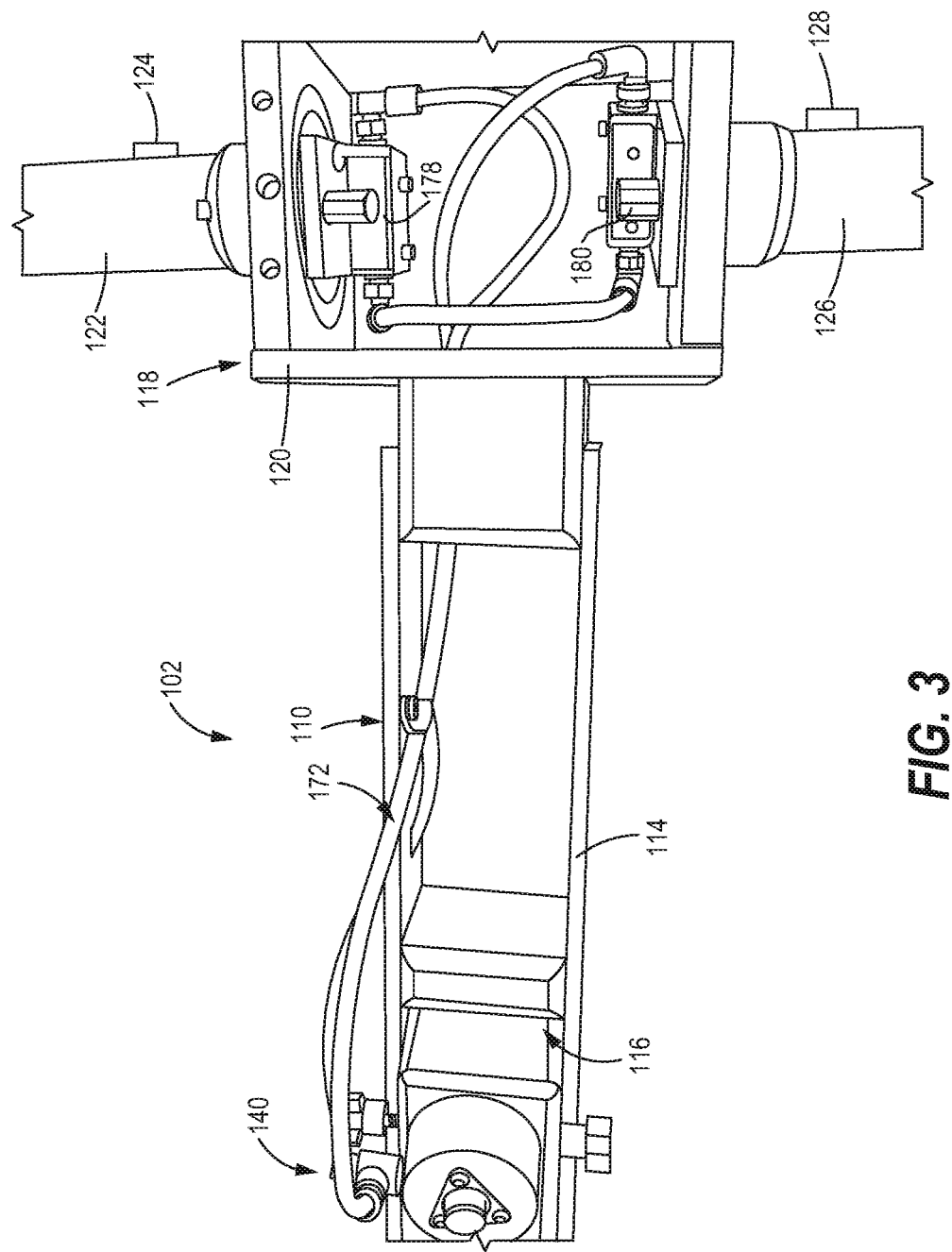
Figure 4:
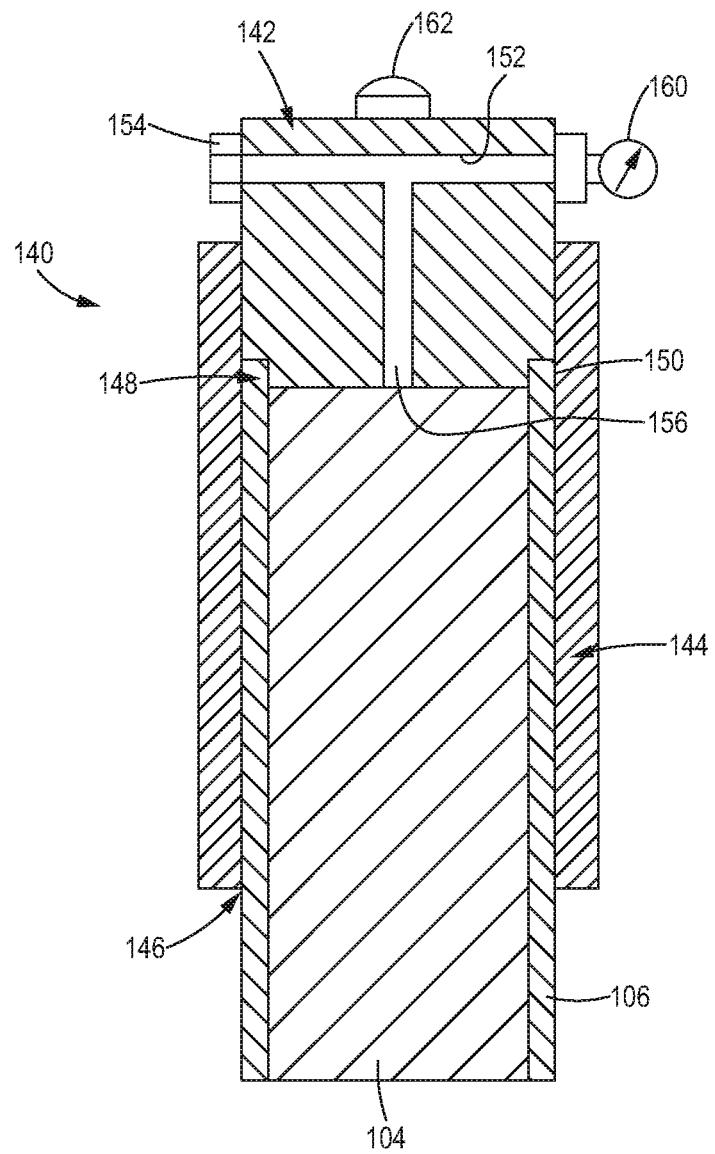
Figure 5:
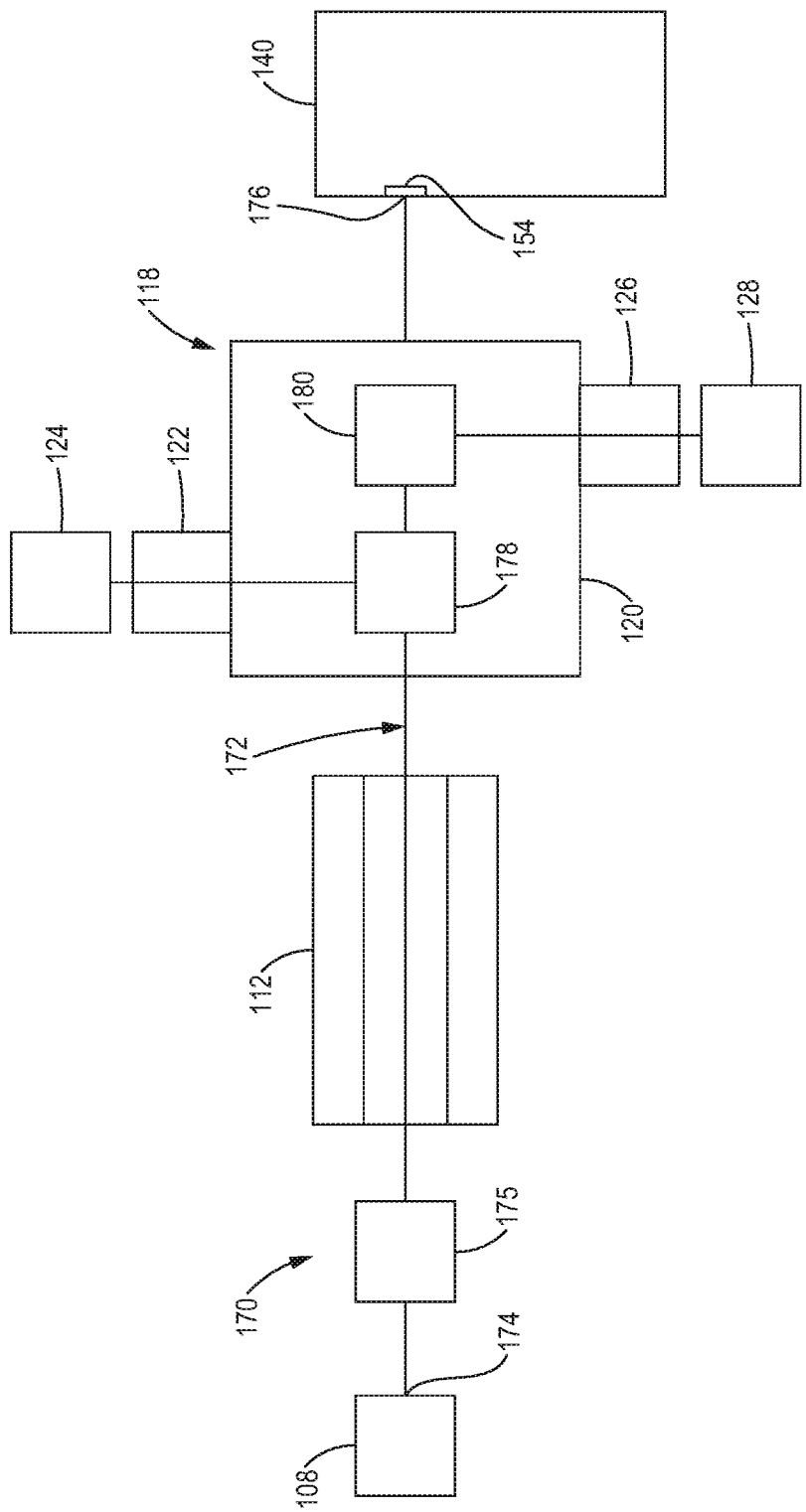
Figure 6:
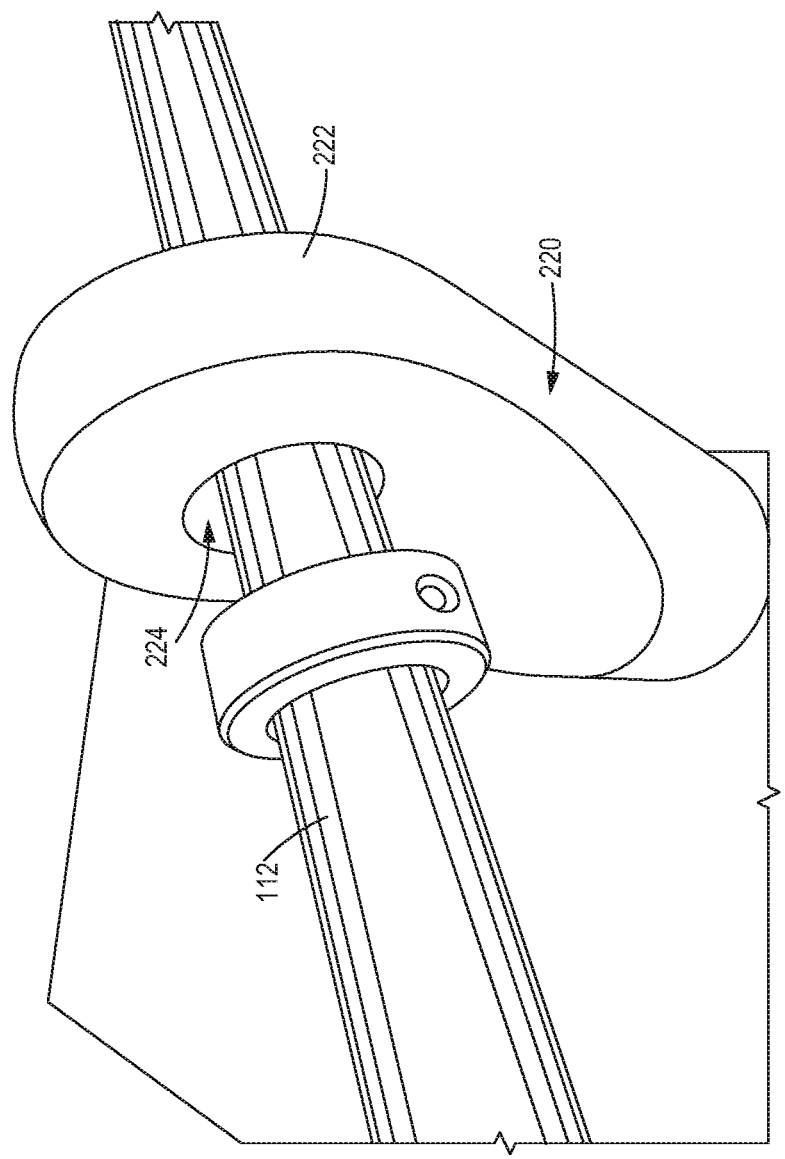
Figure 7:
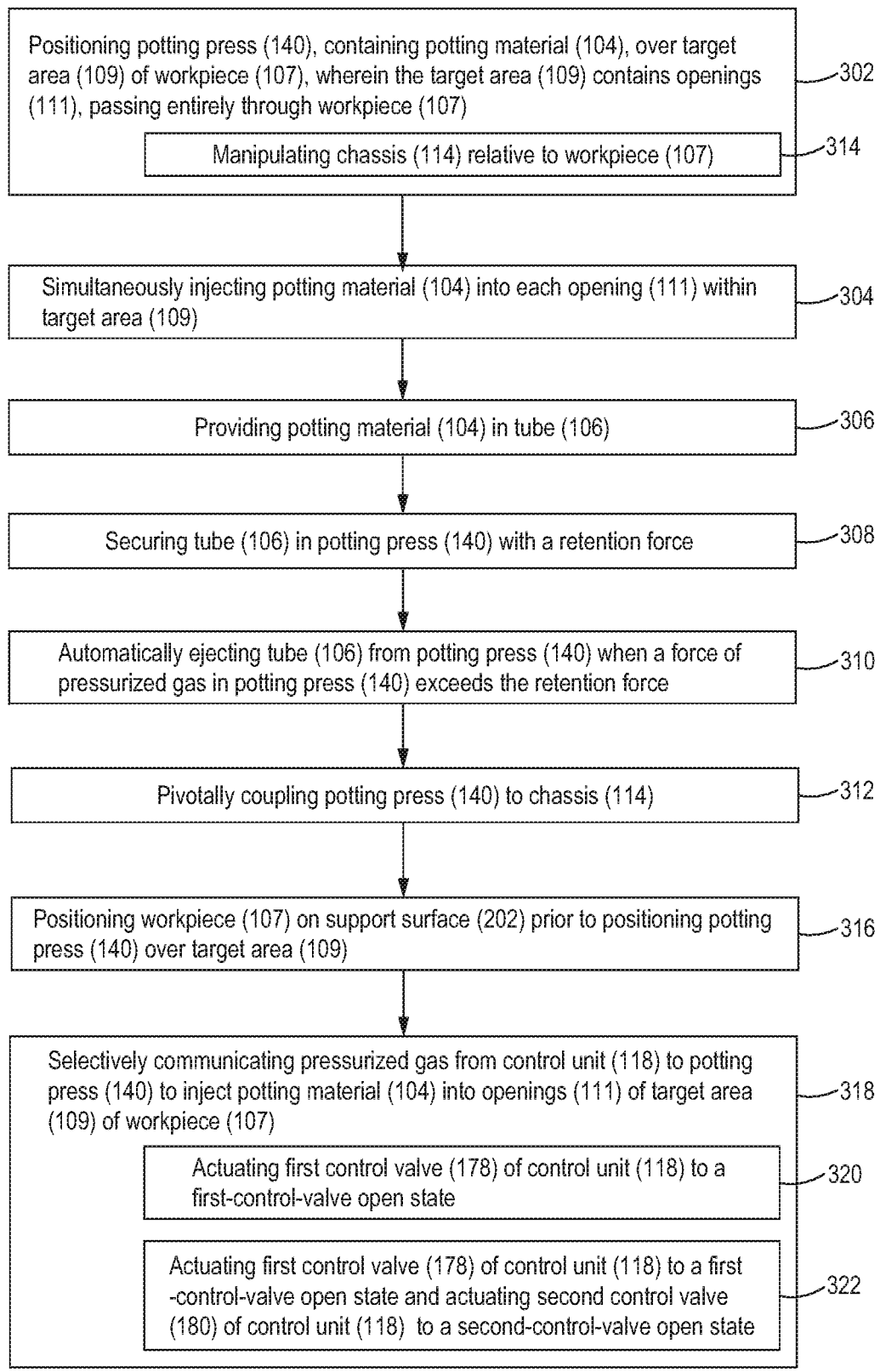
Figure 8:
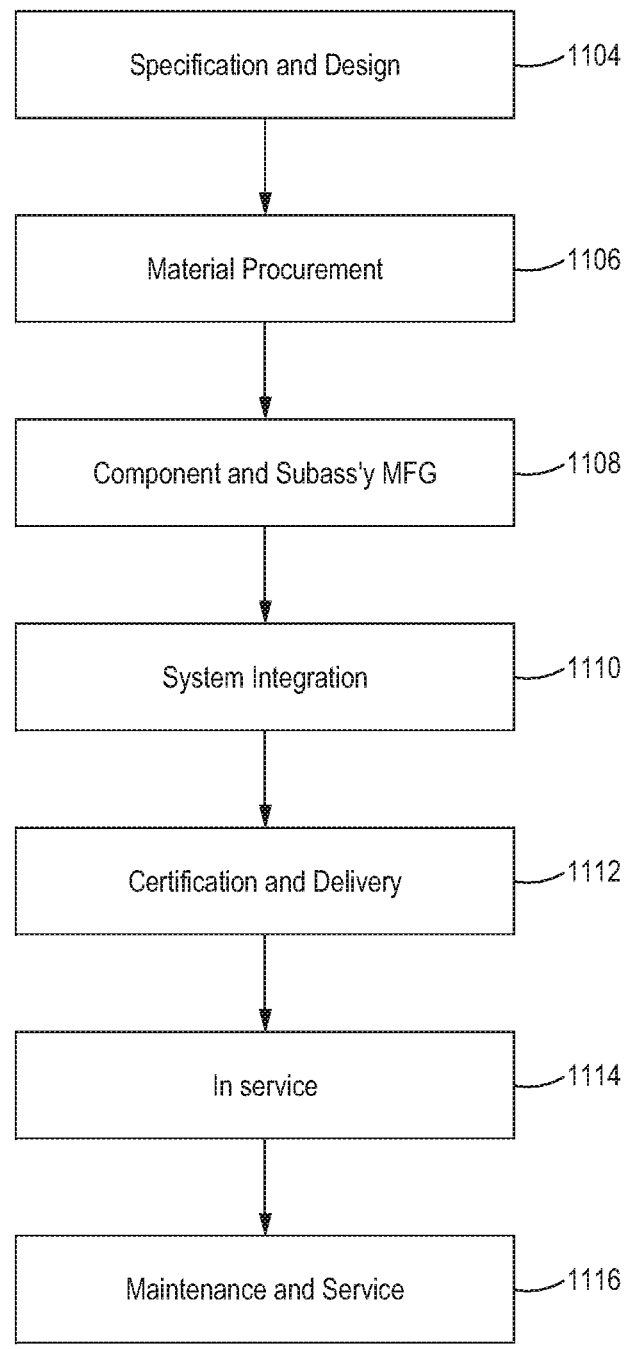
Figure 9:
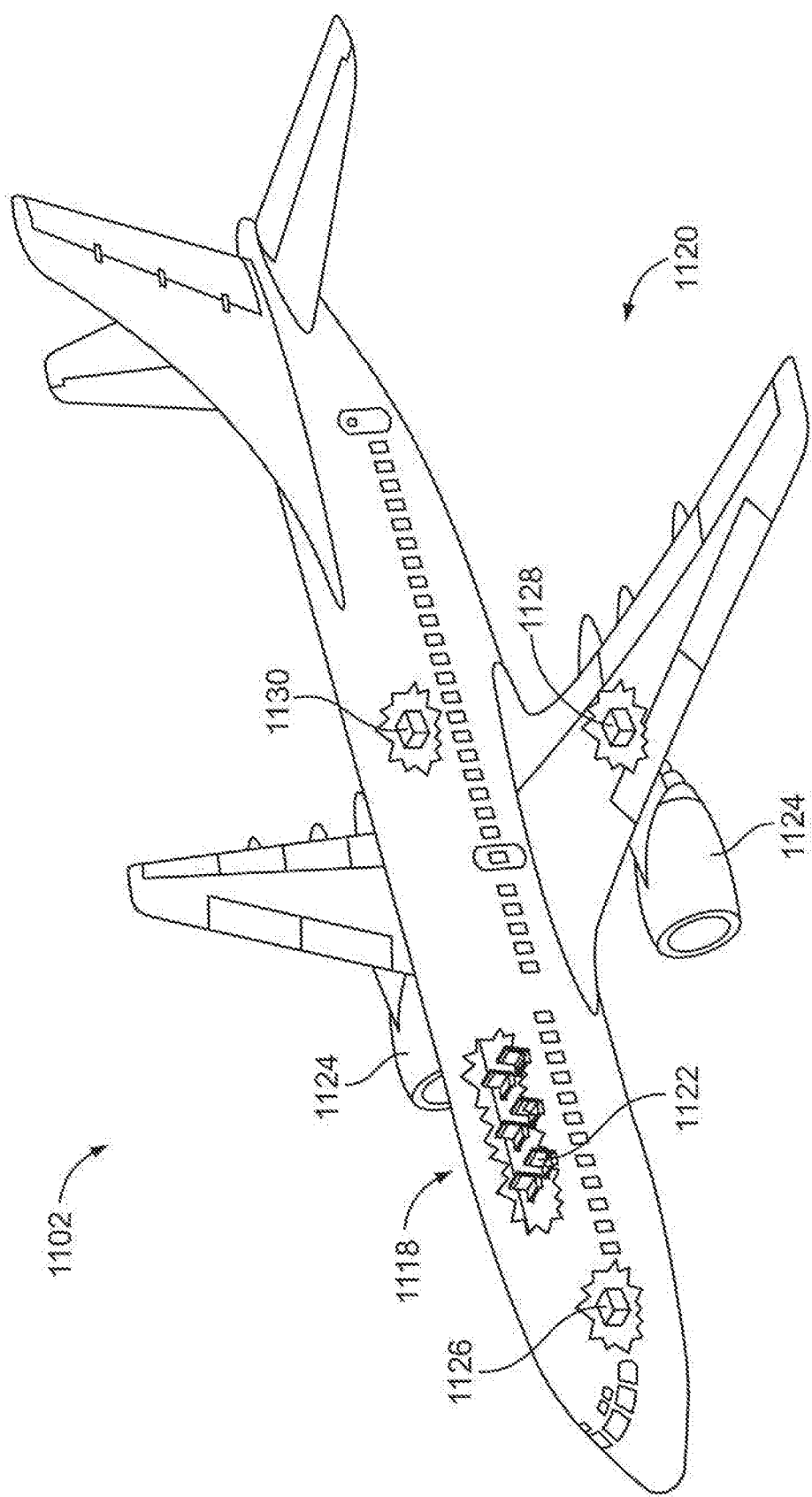

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a potting-material dispensing system, according to one or more examples of the present disclosure;

FIG. 2 is a schematic, perspective view of the potting-material dispensing system of FIG. 1, according to one or more examples of the present disclosure;

FIG. 3 is a schematic, plan view of a detail of the potting-material dispensing system of FIG. 2, according to one or more examples of the present disclosure;

FIG. 4 is a schematic, side elevation view, in cross-section, of a potting press of the potting material dispensing system of FIG. 1, according to one or more examples of the present disclosure;

FIG. 5 is a schematic, block diagram of a control unit and associated components of the potting material dispensing system of FIG. 1, according to one or more examples of the present disclosure;

FIG. 6 is a schematic, perspective view of a reaction clamp of the potting material dispensing system of FIG. 1, according to one or more examples of the present disclosure;

FIG. 7 is a block diagram of a method of utilizing the potting material dispensing system of FIG. 1, according to one or more examples of the present disclosure;

FIG. 8 is a block diagram of aircraft production and service methodology; and FIG. 9 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 8 and 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8 and 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1, and particularly to, e.g., FIGS. 2-5, potting-press assembly 102 for injecting potting material 104 into at least a portion of workpiece 107 is disclosed. Potting-press assembly 102 comprises chassis 114 and potting press 140, pivotally coupled to chassis 114. Potting-press assembly 102 also comprises control unit 118, fixed to chassis 114 and configured to cause potting press 140 to be selectively pressurized. The preceding subject matter of this paragraph characterizes example 1 of the present disclosure.

Use of a support structure (e.g., chassis 114) with potting press 140 pivotally coupled thereto, as set forth above, permits potting press 140 to be positioned at a desired orientation relative to workpiece 107. When workpiece 107 is a flat substrate, for example, it may be advantageous to position potting press 140 at a normal angle relative to the substrate. Accurate orientation of potting press 140 allows potting press 140 to be positioned flush with a surface of workpiece 107, thereby reducing exposure of potting material 104 to the ambient environment and minimizing waste of excess potting material 104 between potting press 140 and workpiece 107. Use of control unit 118 to pressurize potting press 140, as set forth above, allows for automated (i.e., non-manual) injection of potting material 104 from potting press 140. Selective pressurization of potting press 140 allows for more controlled injection of potting material 104 into workpiece 107, thereby reducing waste of excess potting material 104.

For example, workpiece 107 may be a honeycomb core, in which case target area 109 may comprise a plurality of openings 111. Potting press 140 may be directly or indirectly pivotally coupled to chassis 114. Chassis 114 may have press receptacle 116 configured to receive at least a portion of potting press 140. Control unit 118 may be a pneumatic control unit that selectively communicates pressurized fluid to potting press 140.

Referring generally to FIG. 1, and more particularly to, e.g., FIG. 4, potting press 140 comprises pressure head 142 and sleeve 144 that is removably coupled to pressure head 142. The preceding subject matter of this paragraph characterizes example 2 of the present disclosure, wherein example 2 also includes the subject matter according to example 1, above.

Use of potting press 140 with several components (e.g., pressure head 142 and sleeve 144), as set forth above, allows for disassembly of potting press 140 for cleaning. Pressure head 142 and/or sleeve 144 may also facilitate pivotal coupling of potting press 140 with chassis 114.

For example, pressure head 142 may be configured to receive pressurized fluid from control unit 118, and communicate that pressurized fluid to potting material 104, thereby to inject potting material 104 into workpiece 107. Sleeve 144 may be a generally cylindrical member that fits with a mating surface of pressure head 142. For example, sleeve 144 and pressure head 142 may be threaded, clamped, or otherwise releasably engaged to assemble potting press 140. Sleeve 144 may include outlet 146 through which potting material 104 may be loaded into, and discharged from, potting press 140.

Referring generally to FIG. 1 and particularly to, e.g., FIGS. 2 and 4, pressure head 142 of potting press 140 comprises neck 150. Neck 150 is sized to frictionally engage end 103 of tube 106, which contains potting material 104, with a retention force. The preceding subject matter of this paragraph characterizes example 3 of the present disclosure, wherein example 3 also includes the subject matter according to example 2, above.

Use of potting material provided in an enclosure (e.g., tube 106), as set forth above, reduces exposure of potting material 104 to the ambient environment, reduces exposure of the operator to fumes from potting material 104, and reduces direct handling of potting material 104 by the operator. Use of a releasable mechanical engagement (e.g., neck 150 sized to frictionally engage end 103 of tube 106), as set forth above, allows tube 106 to be quickly and easily attached to and detached from potting press 140. Neck 150 may be sized relative to end 103 of tube 106 so that the retention force is exceeded when control unit pressurization exceeds a predetermined pressure value, thereby allowing for automatic detachment of tube 106 from potting press 140. Such a safety release may prevent injection of potting material 104 at excessive pressure levels, which may damage workpiece 107.

For example, tube 106 may include an inner edge sized to receive neck 150 of pressure head 142. The relative sizes of the inner edge of tube 106 and neck 150 may be selected to form a locational fit therebetween. A locational fit, as used herein, may be a clearance fit, a transitional fit, or an interference fit that mechanically couples tube 106 and neck 150 with a predetermined retention force, above which tube 106 may slide relative to neck 150 to disengage.

Referring generally to FIG. 1 and particularly to, e.g., FIG. 4, pressurized-gas passage 152 extends through pressure head 142 of potting press 140 and is communicatively coupled with control unit 118. The preceding subject matter of this paragraph characterizes example 4 of the present disclosure, wherein example 4 also includes the subject matter according to examples 2 or 3, above.

Use of a passage extending through potting press 140 (e.g., pressurized-gas passage 152 in pressure head 142), as set forth above, allows for simplified communicative coupling of potting press 140 to control unit 118. For example, pressurized-gas passage 152 may be formed in pressure head 142, thereby providing an integrated conduit through which fluid may pass. In the illustrated examples, communicatively coupling comprises placing potting press 140 in fluid communication with control unit 118.

For example, pressurized-gas passage 152 may include inlet port 154, configured to receive pressurized fluid, and outlet port 156, configured to discharge pressurized fluid, as shown in FIG. 4. Outlet port 156 may be located so communicate with potting material 104, such as by fluidly communicating with end 103 of tube 106.

Referring generally to FIG. 1 and particularly to, e.g., FIG. 4, pressure head 142 of potting press 140 further comprises pressure gauge 160 that is communicatively coupled with pressurized-gas passage 152. The preceding subject matter of this paragraph characterizes example 5 of the present disclosure, wherein example 5 also includes the subject matter according to example 4, above.

Use of pressure gauge 160 communicatively coupled with pressurized-gas passage 152, as set forth above, allows the user to monitor a pressure level applied to potting material 104. In the illustrated example, pressure gauge 160 is in fluid communication with pressurized-gas passage 152.

For example, pressure gauge 160 may be an air pressure gauge having an analog or digital display for showing the fluid pressure at pressure head 142 of potting press 140.

Referring generally to FIG. 1 and particularly to, e.g., FIG. 4, potting-press assembly 102 also comprises level sensor 162, coupled to pressure head 142 of potting press 140. The preceding subject matter of this paragraph characterizes example 6 of the present disclosure, wherein example 6 also includes the subject matter according to any one of examples 2 to 5, above.

Use of level sensor 162 on pressure head 142 allows a user to determine whether potting press 140 has a level orientation prior to injecting potting material 104 into workpiece 107. Feedback regarding level orientation of potting press 140 may help the user position potting press 140 flush with workpiece 107, thereby reducing potting material 104 that may seep from an incorrectly aligned potting press 140 and may thereby be wasted.

For example, level sensor 162 may be a spirit level, such as a bubble level or a bullseye level, for showing whether potting press 140 is oriented perpendicular to workpiece 107.

Referring generally to FIG. 1 and particularly to, e.g., FIGS. 2, 3, and 5, control unit 118 comprises pressurized-gas conduit 172 that is communicatively coupled to pressure head 142 of potting press 140. Control unit 118 also comprises first control valve 178, configured to prevent gas flow to pressure head 142 through pressurized-gas conduit 172 when first control valve 178 is in a first-control-valve closed state. The preceding subject matter of this paragraph characterizes example 7 of the present disclosure, wherein example 7 also includes the subject matter according to any one of examples 2 to 6, above.

Use of control unit 118 having pressurized-gas conduit 172 permits an existing pressurized gas source 108 to be communicatively coupled, such as by fluid communication, to potting press 140. Use of first control valve 178 in pressurized-gas conduit 172, as set forth above, allows flow of gas through pressurized-gas conduit 172 to be selectively controlled.

For example, pressurized-gas conduit 172 may be formed of flexible tubing and have inlet end 174 coupled to pressurized gas source 108 and outlet end 176 coupled to inlet port 154 of potting press 140. Regulator 175 may be disposed in pressurized-gas conduit 172 near inlet end 174 to ensure that the gas pressure does not exceed a predetermined upper limit. First control valve 178 may be an on/off valve, solenoid valve, pinch valve, or any other type of valve configured either to be disposed in pressurized-gas conduit 172, in which case first control valve 178 includes a valve member capable of closing off pressurized-gas conduit 172, or engage an exterior of pressurized-gas conduit 172, in which case first control valve 178 includes a valve member that deforms pressurized-gas conduit 172 to close off pressurized-gas conduit 172.

Referring generally to FIG. 1 and particularly to, e.g., FIGS. 2, 3, and 5, control unit 118 further comprises second control valve 180 that is configured to prevent the gas flow to pressure head 142 of potting press 140 through pressurized-gas conduit 172 when second control valve 180 is in a second-control-valve closed state. First control valve 178 and second control valve 180 are also configured to permit gas flow to pressure head 142 through pressurized-gas conduit 172 when first control valve 178 is in the first-control-valve open state and second control valve 180 is in the second-control-valve open state. The preceding subject matter of this paragraph characterizes example 8 of the present disclosure, wherein example 8 also includes the subject matter according to example 7, above.

Use of second control valve 180 in pressurized-gas conduit 172, as set forth above, allows redundant control of gas flow through pressurized-gas conduit 172. That is, if second control valve 180 is closed, gas flow is prevented to pressure head 142 even if first control valve 178 is open, and vice versa. In this exemplary implementation, pressurized gas flows to pressure head 142 only when both first control valve 178 and second control valve 180 are open. Accordingly, the use of both first control valve 178 and second control valve 180 further prevents unintended pressurization of potting press 140.

For example, second control valve 180 may be an on/off valve, solenoid valve, pinch valve, or any other type of valve configured either to be disposed in pressurized-gas conduit 172, in which case second control valve 180 includes a valve member capable of closing off pressurized-gas conduit 172, or to engage an exterior of pressurized-gas conduit 172, in which case second control valve 180 includes a valve member that deforms pressurized-gas conduit 172 to close off pressurized-gas conduit 172. Pressurized-gas conduit 172, first control valve 178, and second control valve 180 may be provided together as pressurized gas assembly 170.

Referring generally to FIG. 1 and particularly to, e.g., FIGS. 2, 3, and 5, the first-control-valve open state of first control valve 178 is caused by a first control input and the first-control-valve closed state of first control valve 178 is caused by an absence of the first control input. The preceding subject matter of this paragraph characterizes example 9 of the present disclosure, wherein example 9 also includes the subject matter according to example 8, above.

Using first control valve 178 with a normally closed position, which is present during an absence of a first control input, prevents unintended gas flow to pressure head 142. Selectively opening first control valve 178 when the first control input is provided permits the user to control gas flow to pressure head 142, thereby pressurizing potting press 140.

Referring generally to FIG. 1 and particularly to, e.g., FIGS. 2, 3, and 5, control unit 118 further comprises housing 120, enclosing first control valve 178 and a portion of pressurized-gas conduit 172. Control unit 118 also comprises first handle 122, coupled to housing 120, and first trigger 124, coupled to first handle 122 and configured to provide the first control input to first control valve 178. The preceding subject matter of this paragraph characterizes example 10 of the present disclosure, wherein example 10 also includes the subject matter according to example 9, above.

Use of a first grip on control unit 118 (e.g., first handle 122 and housing 120), as set forth above, allows for easy grasping, manipulation, and positioning of potting-press assembly 102 relative to workpiece 107. Use of first trigger 124 coupled to first handle 122, as set forth above, provides a conveniently placed and ergonomic user interface to control operation of control unit 118. Operation of first trigger 124 generates the first control input to first control valve 178, thereby permitting gas flow through first control valve 178.

For example, housing 120 may be an enclosure. As best shown in FIGS. 3 and 5, first control valve 178 may be entirely disposed within housing 120. First handle 122 may have an ergonomic shape, such as cylindrical as shown, to facilitate grasping by a hand of the user. First trigger 124 may be positioned on first handle 122 at a location easily reached by a finger of the user, thereby to facilitate manual operation of first trigger 124. The first control input may be a mechanical, electrical, or other signal generated by actuation of first trigger 124 and communicated to first control valve 178.

Referring generally to FIG. 1 and particularly to, e.g., FIGS. 2, 3, and 5, the second-control-valve open state of second control valve 180 is caused by a second control input and second-control-valve closed state of second control valve 180 is caused by an absence of second control input. The preceding subject matter of this paragraph characterizes example 11 of the present disclosure, wherein example 11 also includes the subject matter according to example 10, above.

Using second control valve 180 with a normally closed position, which is present during an absence of a second control input, prevents unintended gas flow to pressure head 142. Selectively opening second control valve 180 when the second control input is provided permits the user to control gas flow to pressure head 142, thereby pressurizing potting press 140.

Referring generally to FIG. 1 and particularly to, e.g., FIGS. 2, 3, and 5, control unit 118 further comprises second handle 126, coupled to housing 120, and second trigger 128, coupled to second handle 126 and configured to provide the second control input to second control valve 180. The preceding subject matter of this paragraph characterizes example 12 of the present disclosure, wherein example 12 also includes the subject matter according to example 11, above.

Use of a second grip (e.g., second handle 126), as set forth above, allows for more secure grasping, manipulating, and positioning of potting-press assembly 102 by an operator. Use of a second user interface (e.g., second trigger 128 provided on second handle 126), as set forth above, allows for safer operation of potting-press assembly 102 by requiring simultaneous operation of both triggers before control unit 118 pressurizes potting press 140, thereby further reducing unintended discharge of potting material 104 by potting press assembly 102. Operation of second trigger 128 generates the second control input to second control valve 180, thereby permitting gas flow through second control valve 180.

For example, second handle 126 may have an ergonomic shape, such as cylindrical as shown in FIG. 3, to facilitate grasping by a hand of the user. Second trigger 128 may be positioned on second handle 126 at a location easily reached by a finger of the user, thereby to facilitate manual operation of second trigger 128. The second control input may be a mechanical, electrical, or other signal generated by actuation of second trigger 128 and communicated to second control valve 180.

Referring generally to FIG. 1 and particularly to, e.g., FIGS. 2, 3, and 5, each of first handle 122 and second handle 126 is rotatably coupled to housing 120 of control unit 118. The preceding subject matter of this paragraph characterizes example 13 of the present disclosure, wherein example 13 also includes the subject matter according to example 12, above.

Use of first handle 122 and second handle 126 that are rotatable, as set forth above, allows for more ergonomic manipulation of potting-press assembly 102 as it is repositioned relative to workpiece 107.

Referring generally to FIG. 1 and particularly to, e.g., FIGS. 2, 3, and 5, potting press assembly 102 also comprises lever shaft 112, coupled to chassis 114. The preceding subject matter of this paragraph characterizes example 14 of the present disclosure, wherein example 14 also includes the subject matter according to any one of examples 1 to 13, above.

Use of lever shaft 112 coupled to chassis 114, as set forth above, allows for better stability and position control of potting-press assembly 102 relative to workpiece 107.

Referring generally to FIG. 1 and particularly to, e.g., FIGS. 2 and 6, lever shaft 112 is pivotally coupled to reaction clamp 220. The preceding subject matter of this paragraph characterizes example 15 of the present disclosure, wherein example 15 also includes the subject matter according to example 14, above.

Pivotally coupling lever shaft 112 to reaction clamp 220 facilitates maneuvering of chassis 114 and attached potting-press assembly 102 as desired.

For example, reaction clamp 220 may have collar 222 defining collar aperture 224 through which an end of lever shaft 112 extends, as best shown in FIG. 6. Reaction clamp 220 may be formed of a low-friction material, such as polytetrafluoroethylene (PTFE), to facilitate movement of lever shaft 112 as chassis 114 is repositioned.

Referring generally to FIG. 1 and particularly to, e.g., FIGS. 2-6, system 100 for injecting potting material 104 into at least a portion of workpiece 107 is disclosed. System 100 comprises base 200, which in turn comprises support surface 202. System 100 also comprises hold-down 210, configured to secure workpiece 107 relative to support surface 202, and reaction clamp 220, configured to be coupled to base 200. System 100 additionally comprises potting-press assembly 102, which in turn comprises chassis 114, potting press 140, pivotally coupled to chassis 114, and control unit 118, fixed to chassis 114 and configured to selectively pressurize potting press 140. The preceding subject matter of this paragraph characterizes example 16 of the present disclosure.

Use of base 200, as set forth above, allows for support of workpiece 107 in proximity to potting-press assembly 102. Use of hold-down 210, as set forth above, allows for the secure retention of workpiece 107 in a stationary location relative to potting-press assembly 102. Use of reaction clamp 220 coupled to base 200 and pivotally coupled to chassis 114, as set forth above, allows for more stable positioning of potting-press assembly 102 relative to base 200. Use of a support structure (e.g., chassis 114) with potting press 140 pivotally coupled thereto, as set forth above, permits potting press 140 to be positioned at a desired orientation relative to workpiece 107. When workpiece 107 is a flat substrate, for example, it may be advantageous to position potting press 140 at a normal angle relative to the substrate. Accurate orientation of potting press 140 allows potting press 140 to be positioned flush with a surface of workpiece 107, thereby reducing exposure of potting material 104 to the ambient environment and minimizing waste of excess potting material 104 between potting press 140 and workpiece 107. Use of control unit 118 to pressurize potting press 140, as set forth above, allows for automated (i.e., non-manual) injection of potting material 104 from potting press 140. Selective pressurization of potting press 140 allows for more controlled injection of potting material 104 into workpiece 107, thereby reducing waste of excess potting material 104.

For example, workpiece 107 may be a honeycomb core having target area 109 formed with a plurality of openings 111. Base 200 may be a support structure having support surface 202 that is planar to receive workpiece 107. Potting press 140 may be directly or indirectly pivotally coupled to chassis 114. Chassis 114 may have press receptacle 116 configured to receive at least a portion of potting press 140. Control unit 118 may be a pneumatic control unit that selectively communicates pressurized fluid to potting press 140.

Referring generally to FIG. 1 and particularly to, e.g., FIG. 4, potting press 140 comprises pressure head 142 and sleeve 144 that is removably coupled to pressure head 142. The preceding subject matter of this paragraph characterizes example 17 of the present disclosure, wherein example 17 also includes the subject matter according to example 16, above.

Use of a potting press 140 with several components (e.g., pressure head 142 and sleeve 144), as set forth above, allows for disassembly of potting press 140 for cleaning. Pressure head 142 and/or sleeve 144 may also facilitate pivotal coupling of potting press 140 with chassis 114.

For example, pressure head 142 may be configured to receive pressurized fluid from control unit 118, and communicate that pressurized fluid to potting material 104, thereby to inject potting material 104 into workpiece 107. Sleeve 144 may be a generally cylindrical member that fits with a mating surface of pressure head 142. For example, sleeve 144 and pressure head 142 may be threaded, clamped, or otherwise releasably engaged to assemble potting press 140. Sleeve 144 may include outlet 146 through which potting material 104 may be loaded into, and discharged from, potting press 140.

Referring generally to FIG. 1 and particularly to, e.g., FIGS. 2 and 4, pressure head 142 of potting press 140 comprises neck 150 disposed at a root 148. Neck 150 is sized to frictionally engage end 103 of tube 106, which contains potting material 104, with a retention force. The preceding subject matter of this paragraph characterizes example 18 of the present disclosure, wherein example 18 also includes the subject matter according to example 17, above.

Use of potting material provided in an enclosure (e.g., tube 106), as set forth above, reduces exposure of potting material 104 to the ambient environment, reduces exposure of the operator to fumes from potting material 104, and reduces direct handling of potting material 104 by the operator. Use of a releasable mechanical engagement (e.g., neck 150 sized to frictionally engage end 103 of tube 106), as set forth above, allows tube 106 to be quickly and easily attached to and detached from potting press 140. Neck 150 may be sized relative to end 103 of tube 106 so that the retention force is exceeded when control unit pressurization exceeds a predetermined pressure value, thereby allowing for automatic detachment of tube 106 from potting press 140. Such a safety release may prevent injection of potting material 104 at excessive pressure levels, which may damage workpiece 107.

For example, tube 106 may include an inner edge sized to receive neck 150 of pressure head 142. The relative sizes of the inner edge of tube 106 and neck 150 may be selected to form a locational fit therebetween. A locational fit, as used herein, may be a clearance fit, a transitional fit, or an interference fit that mechanically couples tube 106 and neck 150 with a predetermined retention force, above which tube 106 may slide relative to neck 150 to disengage.

Referring generally to FIG. 1 and particularly to, e.g., FIG. 4, pressurized-gas passage 152 extends through pressure head 142 of potting press 140 and is communicatively coupled with control unit 118. The preceding subject matter of this paragraph characterizes example 19 of the present disclosure, wherein example 19 also includes the subject matter according to example 17 or 18, above.

Use of a passage extending through potting press 140 (e.g., pressurized-gas passage 152 in pressure head 142), as set forth above, allows for simplified communicative coupling of potting press 140 to control unit 118. For example, pressurized-gas passage 152 may be formed in pressure head 142, thereby providing an integrated conduit through which fluid may pass. In the illustrated examples, communicatively coupling comprises placing potting press 140 in fluid communication with control unit 118.

For example, pressurized-gas passage 152 may include inlet port 154, configured to receive pressurized fluid, and outlet port 156, configured to discharge pressurized fluid, as shown in FIG. 4. Outlet port 156 may be located so communicate with potting material 104, such as by fluidly communicating with end 103 of tube 106.

Referring generally to FIG. 1 and particularly to, e.g., FIG. 4, pressure head 142 of potting press 140 further comprises pressure gauge 160 that is communicatively coupled with pressurized-gas passage 152. The preceding subject matter of this paragraph characterizes example 20 of the present disclosure, wherein example 20 also includes the subject matter according to example 19, above.

Use of pressure gauge 160 communicatively coupled with pressurized-gas passage 152, as set forth above, allows the user to monitor a pressure level applied to potting material 104. In the illustrated example, pressure gauge 160 is in fluid communication with pressurized-gas passage 152.

For example, pressure gauge 160 may be an air pressure gauge having an analog or digital display for showing the fluid pressure at pressure head 142 of potting press 140.

Referring generally to FIG. 1 and particularly to, e.g., FIG. 4, system 100 also comprises level sensor 162, coupled to pressure head 142 of potting press 140. The preceding subject matter of this paragraph characterizes example 21 of the present disclosure, wherein example 21 also includes the subject matter according to example 19 or 20, above.

Use of level sensor 162 on pressure head 142 allows a user to determine whether potting press 140 has a level orientation prior to injecting potting material 104 into workpiece 107. Feedback regarding level orientation of potting press 140 may help the user position potting press 140 flush with workpiece 107, thereby reducing potting material 104 that may seep from an incorrectly aligned potting press 140 and may thereby be wasted.

For example, level sensor 162 may be a spirit level, such as a bubble level or a bullseye level, for showing whether potting press 140 is oriented perpendicular to workpiece 107.

Referring generally to FIG. 1 and particularly to, e.g., FIGS. 2, 3, and 5, control unit 118 comprises pressurized-gas conduit 172 that is communicatively coupled to pressure head 142 of potting press 140. Control unit 118 also comprises first control valve 178, configured to prevent gas flow to pressure head 142 through pressurized-gas conduit 172 when first control valve 178 is in a first-control-valve closed state. The preceding subject matter of this paragraph characterizes example 22 of the present disclosure, wherein example 22 also includes the subject matter according to any one of examples 17 to 21, above.

Use of control unit 118 having pressurized-gas conduit 172 permits an existing pressurized gas source 108 to be communicatively coupled, such as by fluid communication, to potting press 140. Use of first control valve 178 in pressurized-gas conduit 172, as set forth above, allows flow of gas through pressurized-gas conduit 172 to be selectively controlled.

For example, pressurized-gas conduit 172 may be formed of flexible tubing and have inlet end 174 coupled to pressurized gas source 108 and outlet end 176 coupled to inlet port 154 of potting press 140. Regulator 175 may be disposed in pressurized-gas conduit 172 near inlet end 174 to ensure that the gas pressure does not exceed a predetermined upper limit. First control valve 178 may be an on/off valve, solenoid valve, pinch valve, or any other type of valve configured either to be disposed in pressurized-gas conduit 172, in which case first control valve 178 includes a valve member capable of closing off pressurized-gas conduit 172, or engage an exterior of pressurized-gas conduit 172, in which case first control valve 178 includes a valve member that deforms pressurized-gas conduit 172 to close off pressurized-gas conduit 172.

Referring generally to FIG. 1 and particularly to, e.g., FIGS. 2, 3, and 5, control unit 118 further comprises second control valve 180 that is configured to prevent the gas flow to pressure head 142 of potting press 140 through pressurized-gas conduit 172 when second control valve 180 is in a second-control-valve closed state. First control valve 178 and second control valve 180 are also configured to permit gas flow to pressure head 142 through pressurized-gas conduit 172 when first control valve 178 is in the first-control-valve open state and second control valve 180 is in the second-control-valve open state. The preceding subject matter of this paragraph characterizes example 23 of the present disclosure, wherein example 23 also includes the subject matter according to example 22, above.

Use of second control valve 180 in pressurized-gas conduit 172, as set forth above, allows redundant control of gas flow through pressurized-gas conduit 172. That is, if second control valve 180 is closed, gas flow is prevented to pressure head 142 even if first control valve 178 is open, and vice versa. In this exemplary implementation, pressurized gas flows to pressure head 142 only when both first control valve 178 and second control valve 180 are open. Accordingly, the use of both first control valve 178 and second control valve 180 further prevents unintended pressurization of potting press 140.

For example, second control valve 180 may be an on/off valve, solenoid valve, pinch valve, or any other type of valve configured either to be disposed in pressurized-gas conduit 172, in which case second control valve 180 includes a valve member capable of closing off pressurized-gas conduit 172, or to engage an exterior of pressurized-gas conduit 172, in which case second control valve 180 includes a valve member that deforms pressurized-gas conduit 172 to close off pressurized-gas conduit 172. Pressurized-gas conduit 172, first control valve 178, and second control valve 180 may be provided together as pressurized gas assembly 170.

Referring generally to FIG. 1 and particularly to, e.g., FIGS. 2, 3, and 5, the first-control-valve open state of first control valve 178 is caused by a first control input and the first-control-valve closed state of first control valve 178 is caused by an absence of the first control input. The preceding subject matter of this paragraph characterizes example 24 of the present disclosure, wherein example 24 also includes the subject matter according to example 23, above.

Using first control valve 178 with a normally closed position, which is present during an absence of a first control input, prevents unintended gas flow to pressure head 142. Selectively opening first control valve 178 when the first control input is provided permits the user to control gas flow to pressure head 142, thereby pressurizing potting press 140.

Referring generally to FIG. 1 and particularly to, e.g., FIGS. 2, 3, and 5, control unit 118 further comprises housing 120, enclosing first control valve 178 and a portion of pressurized-gas conduit 172. Control unit 118 also comprises first handle 122, coupled to housing 120, and first trigger 124, coupled to first handle 122 and configured to provide the first control input to first control valve 178. The preceding subject matter of this paragraph characterizes example 25 of the present disclosure, wherein example 25 also includes the subject matter according to examples 24, above.

Use of a first grip on control unit 118 (e.g., first handle 122 and housing 120), as set forth above, allows for easy grasping, manipulation, and positioning of potting-press assembly 102 relative to workpiece 107. Use of first trigger 124 coupled to first handle 122, as set forth above, provides a conveniently placed and ergonomic user interface to control operation of control unit 118. Operation of first trigger 124 generates the first control input to first control valve 178, thereby permitting gas flow through first control valve 178.

For example, housing 120 may be an enclosure. As best shown in FIGS. 3 and 5, first control valve 178 may be entirely disposed within housing 120. First handle 122 may have an ergonomic shape, such as cylindrical as shown, to facilitate grasping by a hand of the user. First trigger 124 may be positioned on first handle 122 at a location easily reached by a finger of the user, thereby to facilitate manual operation of first trigger 124. The first control input may be a mechanical, electrical, or other signal generated by actuation of first trigger 124 and communicated to first control valve 178.

Referring generally to FIG. 1 and particularly to, e.g., FIGS. 2, 3, and 5, the second-control-valve open state of second control valve 180 is caused by a second control input and second-control-valve closed state of second control valve 180 is caused by an absence of second control input. The preceding subject matter of this paragraph characterizes example 26 of the present disclosure, wherein example 26 also includes the subject matter according to example 25, above.

Using second control valve 180 with a normally closed position, which is present during an absence of a second control input, prevents unintended gas flow to pressure head 142. Selectively opening second control valve 180 when the second control input is provided permits the user to control gas flow to pressure head 142, thereby pressurizing potting press 140.

Referring generally to FIG. 1 and particularly to, e.g., FIGS. 2, 3, and 5, control unit 118 further comprises second handle 126, coupled to housing 120, and second trigger 128, coupled to second handle 126 and configured to provide the second control input to second control valve 180. The preceding subject matter of this paragraph characterizes example 27 of the present disclosure, wherein example 27 also includes the subject matter according to example 26, above.

Use of a second grip (e.g., second handle 126), as set forth above, allows for more secure grasping, manipulating, and positioning of potting-press assembly 102 by an operator. Use of a second user interface (e.g., second trigger 128 provided on second handle 126), as set forth above, allows for safer operation of potting-press assembly 102 by requiring simultaneous operation of both triggers before control unit 118 pressurizes potting press 140, thereby further reducing unintended discharge of potting material 104 by potting press assembly 102. Operation of second trigger 128 generates the second control input to second control valve 180, thereby permitting gas flow through second control valve 180.

For example, second handle 126 may have an ergonomic shape, such as cylindrical as shown in FIG. 3, to facilitate grasping by a hand of the user. Second trigger 128 may be positioned on second handle 126 at a location easily reached by a finger of the user, thereby to facilitate manual operation of second trigger 128. The second control input may be a mechanical, electrical, or other signal generated by actuation of second trigger 128 and communicated to second control valve 180.

Referring generally to FIG. 1 and particularly to, e.g., FIGS. 2, 3, and 5, each of first handle 122 and second handle 126 is rotatably coupled to housing 120 of control unit 118. The preceding subject matter of this paragraph characterizes example 28 of the present disclosure, wherein example 28 also includes the subject matter according to example 27, above.

Use of first handle 122 and second handle 126 that are rotatable, as set forth above, allows for more ergonomic manipulation of potting-press assembly 102 as it is repositioned relative to workpiece 107.

Referring generally to FIG. 1 and particularly to, e.g., FIGS. 2, 3, and 5, system 100 also comprises lever shaft 112, coupled to chassis 114 and operatively connectable to reaction clamp 220. The preceding subject matter of this paragraph characterizes example 29 of the present disclosure, wherein example 29 also includes the subject matter according to any one of examples 16 to 28, above.

Use of lever shaft 112 coupled to chassis 114, as set forth above, allows for better stability and position control of potting-press assembly 102 relative to workpiece 107. Operatively coupling lever shaft 112 to reaction clamp 220 facilitates maneuvering of chassis 114 and attached potting-press assembly 102 as desired.

For example, reaction clamp 220 may have collar 222 defining collar aperture 224 through which an end of lever shaft 112 extends, as best shown in FIG. 6. Reaction clamp 220 may be formed of a low-friction material, such as polytetrafluoroethylene (PTFE), to facilitate movement of lever shaft 112 as chassis 114 is repositioned.

Referring generally to FIG. 1 and particularly to, e.g., FIG. 2, hold-down 210 is coupled to base 200. The preceding subject matter of this paragraph characterizes example 30 of the present disclosure, wherein example 30 also includes the subject matter according to any one of examples 16 to 29, above.

Coupling hold-down 210 to base 200, as set forth above, facilitates positioning of workpiece 107 relative to potting press 140 by permitting hold-down 210 to directly secure workpiece 107 in position on base 200.

For example, hold-down 210 may include bar 211 supported by arms 213. Arms 213 are pivotally coupled to base 200, so that an elevation of bar 211 above base 200 may be adjusted. Bar 211 of hold-down 210 may engage a portion of workpiece 107 other than target area 109.

Referring generally to FIGS. 1-2 and particularly to, e.g., FIG. 7, method 300 of injecting potting material 104 into workpiece 107 is disclosed. Method 300 comprises (block 302) positioning potting press 140, which contains potting material 104, over target area 109 of workpiece 107. Target area 109 contains openings 111 that pass entirely through workpiece 107. Method 300 also comprises (block 304) simultaneously injecting potting material 104 into each one of openings 111 within target area 109. The preceding subject matter of this paragraph characterizes example 31 of the present disclosure.

Potting material 104 may be reliably injected into workpiece 107 using an automated process. Potting press 140 carries potting material 104 and is positionable over target area 109 of workpiece 107. Target area 109 may include multiple openings 111 that pass entirely through workpiece 107, such as the cells of a honeycomb core. The method enables injection of potting material 104 simultaneously into each of openings 111 within target area 109.

Referring generally to FIGS. 1, 2, and 4 and particularly to, e.g., FIG. 7, method 300 further comprises (block 306) providing potting material 104 in tube 106. The preceding subject matter of this paragraph characterizes example 32 of the present disclosure, wherein example 32 also includes the subject matter according to example 31, above.

Providing potting material 104 in tube 106 limits direct exposure of potting material 104 to the ambient environment, thereby reducing fumes and waste.

Referring generally to FIGS. 1, 2, and 4 and particularly to, e.g., FIG. 7, method 300 further comprises (block 308) securing tube 106 in potting press 140 with a retention force. The preceding subject matter of this paragraph characterizes example 33 of the present disclosure, wherein example 33 also includes the subject matter according to example 32, above.

Securing tube 106 in potting press 140 with a retention force permits easy loading of potting material 104 into potting press 140. Additionally, potting material 104 may be easily removed from potting press 140 after injection is complete, thereby facilitating cleanup and possible reuse of residual potting material 104 remaining in tube 106.

Referring generally to FIGS. 1, 2, and 4 and particularly to, e.g., FIG. 7, method 300 further comprises (block 310) automatically ejecting tube 106 from potting press 140 when a force of pressurized gas in potting press 140 exceeds the retention force. The preceding subject matter of this paragraph characterizes example 34 of the present disclosure, wherein example 34 also includes the subject matter according to example 33, above.

Use of a releasable mechanical engagement allows for automatic detachment of tube 106 from potting press 140 when the pressurization level of the fluid from control unit 118 exceeds the retention force. Such a safety release may prevent injection of potting material 104 at excessive pressure levels, which may damage workpiece 107.

For example, tube 106 may include an inner edge sized to receive neck 150 of pressure head 142 of potting press 140. The relative sizes of the inner edge of tube 106 and neck 150 may be selected to form a locational fit therebetween. A locational fit, as used herein, may be a clearance fit, a transitional fit, or an interference fit that mechanically couples tube 106 and neck 150 with a predetermined retention force, above which tube 106 may slide relative to neck 150 to disengage. Accordingly, when a force of the pressurized fluid exceeds the retention force, tube 106 will automatically detach from potting press 140.

Referring generally to FIGS. 1-3 and particularly to, e.g., FIG. 7, method 300 further comprises (block 312) pivotally coupling potting press 140 to chassis 114. The preceding subject matter of this paragraph characterizes example 35 of the present disclosure, wherein example 35 also includes the subject matter according to any one of examples 31 to 34, above.

Pivotally coupling potting press 140 to chassis 114 allows potting press 140 to freely assume a desired orientation relative to workpiece 107.

For example, potting press 140 may be directly or indirectly pivotally coupled to chassis 114. Chassis 114 may have press receptacle 116 configured to receive at least a portion of potting press 140.

Referring generally to FIGS. 1-3 and particularly to, e.g., FIG. 7, according to method 300, positioning potting press 140 over target area 109 comprises (block 314) manipulating chassis 114 relative to workpiece 107. The preceding subject matter of this paragraph characterizes example 36 of the present disclosure, wherein example 36 also includes the subject matter according to example 35, above.

Use of a support structure (e.g., chassis 114) with potting press 140 pivotally coupled thereto, as set forth above, permits potting press 140 to be positioned at a desired orientation relative to workpiece 107. When workpiece 107 is a flat substrate, for example, it may be advantageous to position potting press 140 at a normal angle relative to the substrate. Accurate orientation of potting press 140 allows potting press 140 to be positioned flush with a surface of workpiece 107, thereby reducing exposure of potting material 104 to the ambient environment and minimizing waste of excess potting material 104 between potting press 140 and workpiece 107.

Referring generally to FIGS. 1-2 and particularly to, e.g., FIG. 7, method 300 further comprises (block 316) positioning workpiece 107 on support surface 202 prior to positioning potting press 140 over target area 109. The preceding subject matter of this paragraph characterizes example 37 of the present disclosure, wherein example 37 also includes the subject matter according to any one of examples 31 to 36, above.

Using support surface 202 and positioning workpiece 107 on support surface 202 positively locates workpiece 107 relative to potting press 140, thereby facilitating more accurate positioning of potting press 140 over target area 109.

Referring generally to FIGS. 1-5 and particularly to, e.g., FIG. 7, method 300 further comprises (block 318) selectively communicating pressurized gas from control unit 118 to potting press 140 to inject potting material 104 into openings 111 of target area 109 of workpiece 107. The preceding subject matter of this paragraph characterizes example 38 of the present disclosure, wherein example 38 also includes the subject matter according to any one of examples 31 to 37, above.

Use of control unit 118 to pressurize potting press 140, as set forth above, allows for automated (i.e., non-manual) injection of potting material 104 from potting press 140. Selective pressurization of potting press 140 allows for more controlled injection of potting material 104 into workpiece 107, thereby reducing waste of excess potting material 104.

Referring generally to FIGS. 1-3 and 5 and particularly to, e.g., FIG. 7, according to method 300, selectively communicating the pressured gas from control unit 118 to potting press 140 comprises (block 320) actuating first control valve 178 of control unit 118 to a first-control-valve open state. The preceding subject matter of this paragraph characterizes example 39 of the present disclosure, wherein example 39 also includes the subject matter according to example 38, above.

Use of first control valve 178, as set forth above, allows for the selective control of flow of pressurized fluid through first control valve 178.

Referring generally to FIGS. 1-3 and 5 and particularly to, e.g., FIG. 7, according to method 300, selectively communicating the pressured gas from control unit 118 to potting press 140 comprises (block 322) actuating first control valve 178 of control unit 118 to a first-control-valve open state and actuating second control valve 180 of control unit 118 to a second-control-valve open state. The preceding subject matter of this paragraph characterizes example 40 of the present disclosure, wherein example 40 also includes the subject matter according to example 38, above.

Use of both first control valve 178 and second control valve 180, as set forth above, allows for safer operation of potting-press assembly 102 by requiring simultaneous operation of both first control valve 178 and second control valve 180 before control unit 118 pressurizes potting press 140.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of injecting potting material (104) into at least a portion of a workpiece (107), the method comprising:
    positioning a potting press (140), containing the potting material (104), over a target area (109) of the workpiece (107), wherein the target area (109) contains openings (111), passing entirely through the workpiece (107), and wherein the potting material (104) is contained in a tube (106);
    injecting the potting material (104) simultaneously into each one of the openings (111) within the target area (109);

the potting press (140) includes a pressure head (142) having a neck (150) and the potting press (40) includes a sleeve (144) removably coupled to the pressure head (142), wherein an end (103) of the tube (106) includes an inner edge configured to receive the neck (150);

connecting and disconnecting the tube (106) in the potting press (140) via frictional engagement between the neck (150) and the inner edge of the tube (106) to define a retention force;

wherein the pressure head (142) defines a pressurized-gas passage (152) including an inlet port (154) and an outlet port (156), and the pressurized-gas passage (152) extends through the pressure head (142) of the potting press (140) such that the end (103) of the tube (106) surrounds the outlet port (156); and selectively communicating pressurized gas from a control unit (118) to the pressurized-gas passage (152) and out of the outlet port (156) of the pressurized-gas passage (152) into the tube (106) such that the pressurized gas applies a force directly to the potting material (104) to expel the potting material (104) out of the tube (106) which injects the potting material (104) into the openings (111) of the target area (109) of the workpiece (107).

2. The method according to claim 1, wherein connecting and disconnecting the tube (106) further comprises automatically ejecting the tube (106) from the neck (150) of the pressure head (142) when a force of the pressurized gas in the potting press (140) exceeds the retention force.

3. The method according to claim 1, further comprising pivotally coupling the potting press (140) to a chassis (114).

4. The method according to claim 3, wherein positioning the potting press (140) over the target area (109) further comprises manipulating the chassis (114) relative to the workpiece (107).

5. The method according to claim 1, further comprising positioning the workpiece (107) on a support surface (202) prior to positioning the potting press (140) over the target area (109).

6. The method according to claim 1, wherein selectively communicating the pressurized gas from the control unit (118) to the potting press (140) further comprises actuating a first control valve (178) of the control unit (118) to a first-control-valve open state.

7. The method according to claim 1, wherein selectively communicating the pressurized gas from the control unit (118) to the potting press (140) further comprises actuating a first control valve (178) of the control unit (118) to a first-control-valve open state and actuating a second control valve (180) of the control unit (118) to a second-control-valve open state.

8. A method of injecting potting material (104) into at least a portion of a workpiece (107), the method comprising:
positioning the workpiece (107) on a support surface (202);
securing the workpiece (107) relative to the support surface (202) using a hold-down (210);
positioning a potting press (140), containing the potting material (104), over a target area (109) of the workpiece (107), wherein the target area (109) contains openings (111), passing entirely through the workpiece (107), and wherein the potting press (140) comprises a pressure head (142), and wherein the potting material (104) is contained in a tube (106);
selectively communicating pressurized gas from a control unit (118) to the pressure head (142) of the potting press (140) to inject the potting material (104) into each one of the openings (111) within the target area (109) of the workpiece (107);

injecting the potting material (104) simultaneously into each one of the openings (111) within the target area (109);

wherein the pressure head (142) includes a neck (150) and the potting press (40) includes a sleeve (144) removably coupled to the pressure head (142), wherein an end (103) of the tube (106) includes an inner edge configured to receive the neck (150);

connecting and disconnecting the tube (106) in the potting press (140) via frictional engagement between the neck (150) and the inner edge of the tube (106) to define a retention force;

wherein the pressure head (142) defines a pressurized-gas passage (152) including an inlet port (154) and an outlet port (156), and the pressurized-gas passage (152) extends through the pressure head (142) of the potting press (140) such that the end (103) of the tube (106) surrounds the outlet port (156); and wherein selectively communicating the pressurized gas from the control unit (118) further comprises selectively communicating the pressurized gas from the control unit (118) to the pressurized-gas passage (152) and out of the outlet port (156) of the pressurized-gas passage (152) into the tube (106) such that the pressurized gas applies a force directly to the potting material (104) to expel the potting material (104) out of the tube (106) which injects the potting material (104) into the openings (111) of the target area (109) of the workpiece (107).

9. The method according to claim 8, wherein selectively communicating the pressurized gas from the control unit (118) to the potting press (140) further comprises actuating a first control valve (178) of the control unit (118) to a first-control-valve open state.

10. The method according to claim 8, wherein selectively communicating the pressurized gas from the control unit (118) to the potting press (140) further comprises actuating a first control valve (178) of the control unit (118) to a first-control-valve open state and actuating a second control valve (180) of the control unit (118) to a second-control-valve open state.

11. The method according to claim 8, further comprising automatically ejecting the tube (106) from the potting press (140) when a force of the pressurized gas in the potting press (140) exceeds the retention force.

12. A method of injecting potting material (104) into at least a portion of a workpiece (107), the method comprising:
positioning a potting press (140), containing the potting material (104), over a target area (109) of the workpiece (107), wherein the target area (109) contains openings (111), passing entirely through the workpiece (107), and wherein the potting press (140) comprises a pressure head (142), with a pressurized-gas passage (152) extending through the pressure head (142) of the potting press (140), and wherein the potting material (104) is contained in a tube (106);
selectively communicating pressurized gas from a control unit (118) to the pressurized-gas passage (152) of the pressure head (142) of the potting press (140) to inject the potting material (104) into each one of the openings (111) within the target area (109) of the workpiece (107), wherein the control unit (118) comprises a pressurized-gas conduit (172), communicatively coupled to the pressure head (142) of the potting press (140), and a first control valve (178), configured to prevent gas flow to the pressure head (142) through the pressurized-gas conduit (172) when the first control valve (178) is in a first-control-valve closed state;

injecting the potting material (104) simultaneously into each one of the openings (111) within the target area (109);

wherein the pressure head (142) includes a neck (150) and the potting press (40) includes a sleeve (144) removably coupled to the pressure head (142), wherein an end (103) of the tube (106) includes an inner edge configured to receive the neck (150);

connecting and disconnecting the tube (106) in the potting press (140) via frictional engagement between the neck (150) and the inner edge of the tube (106) to define a retention force;

wherein the pressurized-gas passage (152) includes an inlet port (154) and an outlet port (156), and the pressurized-gas passage (152) extends through the pressure head (142) of the potting press (140) such that the end (103) of the tube (106) surrounds the outlet port (156); and wherein selectively communicating the pressurized gas from the control unit (118) further comprises selectively communicating the pressurized gas from the control unit (118) to the pressurized-gas passage (152) and out of the outlet port (156) of the pressurized-gas passage (152) into the tube (106) such that the pressurized gas applies a force directly to the potting material (104) to expel the potting material (104) out of the tube (106) which injects the potting material (104) into the openings (111) of the target area (109) of the workpiece (107).

13. The method according to claim 12, wherein selectively communicating the pressurized gas from the control unit (118) to the pressurized-gas passage (152) of the pressure head (142) of the potting press (140) further comprises actuating the first control valve (178) of the control unit (118) from the first-control-valve closed state to a first-control-valve open state.

14. The method according to claim 1,
further including a chassis (114) attached to the control unit (118), and the chassis (114) supports the potting press (140) such that the potting press (140) is pivotable relative to the chassis (114), and wherein the chassis (114) surrounds the potting press (140); and
positioning the potting press (140) over the target area (109) of the workpiece (107) further comprises pivotably moving the potting press (140) relative to the chassis (114).

15. The method according to claim 1,
further including a chassis (114) attached to the control unit (118);
further including a lever shaft (112) attached to a first end of the chassis (114), and a second end of the chassis (114) is attached to the control unit (118) such that the chassis (114) is disposed between the lever shaft (112) and the control unit (118); and
wherein positioning the potting press (140) over the target area (109) of the workpiece (107) further comprises adjusting a position of the lever shaft (112) relative to a reaction clamp (220).

16. The method according to claim 15,
further comprising positioning the workpiece (107) on a support surface (202) prior to positioning the potting press (140) over the target area (109); and
wherein the reaction clamp (220) is attached to the support surface (202) and the reaction clamp (220) defines a collar aperture (224), and wherein the lever shaft (112) is disposed through the collar aperture (224).

17. The method according to claim 1,
further including a level sensor (162) coupled to the pressure head (142); and
further comprising determining whether the potting press (140) is disposed per relative to the workpiece (107) using the level sensor (162).

18. The method according to claim 1, further comprising securing the workpiece (107) relative to a support surface (202) using a hold-down (210) engaging the workpiece (107) in a location away from the target area (109).

19. The method according to claim 18, wherein:
the hold-down (210) includes a bar (211) pivotably supported via arms (213); and
securing the workpiece (107) further comprises adjusting a height of the bar (211) relative to the workpiece (107).

20. The method according to claim 1,
wherein the control unit (118) includes a first handle (122) having a first trigger (124);
wherein the control unit (118) includes a second handle (126) having a second trigger (128), wherein the first handle (122) is spaced from the second handle (124);
wherein positioning the potting press (140) over the target area (109) of the workpiece (107) further comprises adjusting the potting press (140) via the first handle (122) and/or the second handle (124); and
further comprising activating the first trigger (124) and the second trigger (128) simultaneously to pressurize the potting press (140).

* * * * *